United States Patent
Nowottnick

(10) Patent No.: US 11,533,612 B2
(45) Date of Patent: Dec. 20, 2022

(54) TRANSCEIVER SYSTEM

(71) Applicant: NXP B.V., Eindhoven (NL)

(72) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 232 days.

(21) Appl. No.: 16/029,496

(22) Filed: Jul. 6, 2018

(65) Prior Publication Data
US 2019/0075454 A1    Mar. 7, 2019

(30) Foreign Application Priority Data
Sep. 7, 2017  (EP) ..................................... 17189946

(51) Int. Cl.
*H04W 12/04*    (2021.01)
*H04L 9/32*    (2006.01)
(Continued)

(52) U.S. Cl.
CPC .............. *H04W 12/04* (2013.01); *H04B 1/40* (2013.01); *H04L 9/0656* (2013.01);
(Continued)

(58) Field of Classification Search
CPC .... H04W 12/04; H04L 9/0656; H04L 9/3239; H04L 9/3242; H04L 9/3271; H04L 2209/805; H04L 2209/84; H04B 1/40
See application file for complete search history.

(56) References Cited

U.S. PATENT DOCUMENTS

| | | | |
|---|---|---|---|
| 5,454,039 A * | 9/1995 | Coppersmith | G06F 21/80 380/46 |
| 6,477,252 B1 * | 11/2002 | Faber | H04K 1/00 713/193 |

(Continued)

FOREIGN PATENT DOCUMENTS

| | | |
|---|---|---|
| CN | 104243535 A | 12/2014 |
| CN | 105635147 A | 6/2016 |

(Continued)

OTHER PUBLICATIONS

Dolev, S. et al. "Peripheral authentication for autonomous vehicles", 2016 IEEE 15th International Symposium on Network Computing and Applications (NCA), Cambridge, MA, pp. 282-285 (2016).
(Continued)

*Primary Examiner* — Saleh Najjar
*Assistant Examiner* — Devin E Almeida

(57) ABSTRACT

A first-transceiver for communicating with a second-transceiver is disclosed. The first and second-transceivers are vehicle-access-system transceivers. The transceivers include a cipher-module configured to generate a cipher-code using a cipher key and an input value, an encryption-module configured to generate encrypted-payload-data from payload-data using the cipher-code, a hashing-module configured to hash the payload-data to generate hashed-payload-data using the cipher-code, and a transmitter configured to transmit the encrypted-payload-data and the hashed-payload-data to the second-transceiver. A vehicle including the first-transceiver is also disclosed. Access to one or more systems of the vehicle are controlled in accordance with a validation state.

13 Claims, 4 Drawing Sheets

(51) Int. Cl.
*H04B 1/40* (2015.01)
*H04L 9/06* (2006.01)
(52) U.S. Cl.
CPC .......... *H04L 9/3239* (2013.01); *H04L 9/3242* (2013.01); *H04L 9/3271* (2013.01); *H04L 2209/805* (2013.01); *H04L 2209/84* (2013.01)

(56) References Cited

U.S. PATENT DOCUMENTS

| | | | |
|---|---|---|---|
| 7,178,025 B2 | 2/2007 | Scheidt et al. | |
| 7,603,556 B2 | 10/2009 | Brown et al. | |
| 8,526,606 B2 | 9/2013 | Muthaiah | |
| 8,666,064 B2* | 3/2014 | Choi | H04L 9/0637 380/28 |
| 9,288,048 B2 | 3/2016 | Han et al. | |
| 10,095,634 B2 | 10/2018 | Sharma | |
| 10,560,269 B2* | 2/2020 | Johnson | H04L 9/3239 |
| 2002/0034300 A1 | 3/2002 | Thuvesholmen et al. | |
| 2003/0021419 A1* | 1/2003 | Hansen | H04L 9/0637 380/277 |
| 2006/0177056 A1 | 8/2006 | Rostin et al. | |
| 2007/0200671 A1 | 8/2007 | Kelly et al. | |
| 2008/0301461 A1 | 12/2008 | Coulier et al. | |
| 2009/0147950 A1* | 6/2009 | Yoon | H04L 9/0618 380/44 |
| 2009/0249074 A1* | 10/2009 | Madhavan | H04L 9/3263 713/176 |
| 2012/0011351 A1* | 1/2012 | Mundra | H04L 47/2441 713/1 |
| 2012/0295592 A1 | 11/2012 | Peirce | |
| 2013/0101120 A1* | 4/2013 | Brique | H04N 21/4367 380/268 |
| 2013/0136256 A1* | 5/2013 | Relyea | H04L 9/0637 380/28 |
| 2014/0049366 A1 | 2/2014 | Vasquez | |
| 2014/0146964 A1* | 5/2014 | Yamada | H04L 9/0643 380/28 |
| 2014/0169564 A1 | 6/2014 | Gautama et al. | |
| 2014/0270172 A1* | 9/2014 | Peirce | H04L 63/08 380/270 |
| 2014/0286486 A1* | 9/2014 | Lee | H04L 9/003 380/28 |
| 2015/0052352 A1* | 2/2015 | Dolev | H04L 9/3215 713/156 |
| 2015/0113275 A1* | 4/2015 | Kim | H04L 9/3278 713/169 |
| 2015/0188704 A1* | 7/2015 | Takenaka | H04L 9/3236 713/171 |
| 2016/0267738 A1* | 9/2016 | Carstens | E05B 47/0001 |
| 2016/0344552 A1* | 11/2016 | Sharma | G06F 21/85 |
| 2016/0366109 A1* | 12/2016 | Lablans | H04L 63/0428 |
| 2016/0366156 A1* | 12/2016 | Kantor | H04L 63/0281 |
| 2017/0244566 A1* | 8/2017 | Tschache | H04L 9/3242 |
| 2017/0310674 A1* | 10/2017 | Markham | H04L 63/061 |
| 2018/0091309 A1* | 3/2018 | Misoczki | H04L 9/3242 |
| 2018/0189195 A1* | 7/2018 | Chun | G06F 21/602 |
| 2018/0285555 A1* | 10/2018 | Dong | H04L 63/10 |
| 2018/0294968 A1* | 10/2018 | Johnson | H04L 9/0643 |

FOREIGN PATENT DOCUMENTS

| | | |
|---|---|---|
| CN | 106972926 A | 7/2017 |
| CN | 105704160 A | 1/2019 |

OTHER PUBLICATIONS

Ahmad, S. et al. "Energy efficient sensor network security using Stream cipher mode of operation", 2010 International Conference on Computer and Communication Technology (ICCCT), Allahabad, Uttar Pradesh, pp. 348-354 (2010).

* cited by examiner

TRANSCEIVER SYSTEM

CROSS-REFERENCE TO RELATED APPLICATIONS

This application claims the priority under 35 U.S.C. § 119 of European Patent application no. 17189946.1, filed on Sep. 7, 2017, the contents of which are incorporated by reference herein.

The present disclosure relates to a transceiver system and in particular, although not exclusively, to a transceiver system for controlling access to a vehicle.

According to a first aspect of the present disclosure there is provided a first-transceiver for communicating with a second-transceiver. The first transceiver comprises:
  a cipher-module configured to generate a cipher-code using a cipher key and an input value;
  an encryption-module configured to generate encrypted-payload-data from payload-data using the cipher-code;
  a hashing-module configured to hash the payload-data to generate hashed-payload-data using the cipher-code; and
  a transmitter configured to transmit the encrypted-payload-data and the hashed-payload-data to the second-transceiver.

The first and second-transceivers may be vehicle-access-system transceivers. The vehicle-access-system may be a passive keyless entry system, passive keyless go system, fleet or rental vehicle access control system, or a system to control access to specific functionality of a vehicle.

The transceiver may have applications in systems other than vehicle-access-systems in which there are stringent energy consumption or processing capability constraints. For example, the transceivers may also be used to implement an RF ID, or chip-card, system.

In one or more embodiments, the first-transceiver comprises a receiver configured to receive received-hashed-response and a received-encrypted-response. The first transceiver may comprise a decryption-module configured to decrypt the received-encrypted-response to provide a decrypted-received-response using the cipher-code. The hashing-module may be further configured to hash the decrypted-received-response to generate a hashed-decrypted-response. The first transceiver may comprise a validator configured to set a validation state in accordance with a comparison of the hashed-decrypted-response and the received-hashed-response.

In one or more embodiments, the encryption-module is configured to generate the encrypted-payload-data using a first section of the cipher-code. The hashing-module may be configured to generate the hashed-payload-data using a different, second section of the cipher-code.

According to a further aspect there is provided a second-transceiver for communicating with a first-transceiver. The second-transceiver comprises:
  a cipher-module configured to provide a cipher-code using a cipher key and an input value;
  an encryption-module configured to generate an encrypted-response from a response-signature using the cipher-code;
  a hashing-module configured to hash the response-signature to generate a hashed-response using the cipher-code; and
  a transmitter configured to transmit the encrypted-response and the hashed-response to the first-transceiver.

In one or more embodiments, the second-transceiver comprises a receiver configured to receive received-hashed-payload-data and received-encrypted-payload-data. The second-transceiver may comprise a decryption-module configured to decrypt the received-encrypted-payload-data to provide decrypted-received-payload-data using the cipher-code. The hashing-module may be further configured to hash the decrypted-received-payload-data to generate hashed-decrypted-payload-data. The second-transceiver may comprise a validator configured to enable one or more of the encryption-module, hashing-module and the transmitter in accordance with a comparison of the hashed-decrypted-payload-data and the received-hashed-payload-data.

In one or more embodiments, the second-transceiver comprises an energy storage unit coupled to an antenna in order to receive energy and configured to power the transceiver during use.

In one or more embodiments, the encryption-module is configured to generate the encrypted-response using a first section of the cipher-code. The hashing-module may be configured to generate the hashed-response using a different, second section of the cipher-code.

In one or more embodiments, the cipher-module is configured to operate in an output feedback, OFB, mode.

In one or more embodiments, the cipher-module is an AES encryption-module such as an AES-128 encryption-module. The cipher-code may be a random or pseudo-random number. The cipher-code may be an output vector of the cipher-module.

The encryption-module may perform an XOR operation on each bit of the payload data and each corresponding bit of the output code.

In one or more embodiments, the hashing-module is configured to apply a shift-register-based hash such as a HT3-based hash.

In one or more embodiments, the hashing-module is implemented using run-time of a multi-purpose processor.

The transceiver may be a computationally or energy-usage limited device.

According to a further aspect there is provided a vehicle comprising the first-transceiver. Access to one or more systems of the vehicle may be controlled by the vehicle in accordance with the validation state.

According to a further aspect there is provided a vehicle-access-system comprising:
  the first-transceiver; and
  the second-transceiver,
    in which the cipher-module of the first-transceiver is configured to use the same key as the cipher-module of the second-transceiver in, for example, a symmetric encryption scheme.

In one or more embodiments, the transceivers are configured to iteratively transmit encrypted-payload-data and encrypted responses. A new cipher-code may be used for each iteration.

The transceivers may be configured to conduct a four-pass authentication procedure. The four passes may comprise a challenge-pass, a return-pass, a message-authentication-code-pass and a response-pass.

According to a further aspect there is provided a method comprising:
  generating a cipher-code using a cipher key and an input value;
  generating, at a first-transceiver, encrypted-payload-data from payload-data using the cipher-code;
  hashing, at the first-transceiver, the payload-data to generate hashed-payload-data using the cipher-code;
  transmitting, at the first-transceiver, the encrypted-payload-data and the hashed-payload-data;

receiving, at a second-transceiver, received-encrypted-payload-data and received-hashed-payload-data;

decrypting, at the second-transceiver, the received-encrypted-payload-data to provide decrypted-received-payload-data using the cipher-code;

hashing, at the second-transceiver, the decrypted-received-payload-data to generate hashed-decrypted-payload-data;

in accordance with a comparison of the hashed-decrypted-payload-data and the received-hashed-payload-data:

generating, at the second-transceiver, an encrypted-response from a response-signature using the cipher-code;

hashing, at the second-transceiver, the response-signature to generate a hashed-response using the cipher-code;

transmitting the encrypted-payload-data and the hashed-payload-data to the first-transceiver;

receiving, at the first-transceiver, a received-encrypted-response and a received-hashed-response;

decrypting, at the first-transceiver, the received-encrypted-response to provide a decrypted-received-response using the cipher-code;

hashing, at the first-transceiver, the decrypted-received-response to generate a hashed-decrypted-response; and setting, at the first-transceiver, a validation state in accordance with a comparison of the hashed-decrypted-response and the received-hashed-response. The method may be a method for operating a vehicle-access-system.

The method may provide an encrypted data exchange performed after successful authentication, such as four-pass authentication. While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Vehicle-access-systems include passive keyless entry systems, passive keyless go systems, fleet or rental vehicle access control systems, and systems to control access to specific functionality of vehicles.

Stringent energy consumption requirements are typically placed on access control systems for vehicles. For instance, it is desirable to reduce the drain on the battery in a key fob/in a vehicle in order to improve battery life between battery changes/charges (vehicle usage). Such energy usage requirements typically translate into constraints on the computational capabilities of the vehicle-access-systems.

State of the art authentication procedures in vehicle-access-systems are not timing and energy optimized. The security of the currently applied authentication procedures in such systems may not be optimized to provide sufficient security and minimum frame length.

In particular, the current state of the art encrypted data communication for automotive applications is not hash protected due to high demands that hash seed generation would place on the system's capabilities and energy consumption. Hence, the data integrity cannot be guaranteed. Procedures for encrypted data transfer for an automotive access system without data integrity checks are described below with regard to FIGS. 1 and 2.

Figure 1:
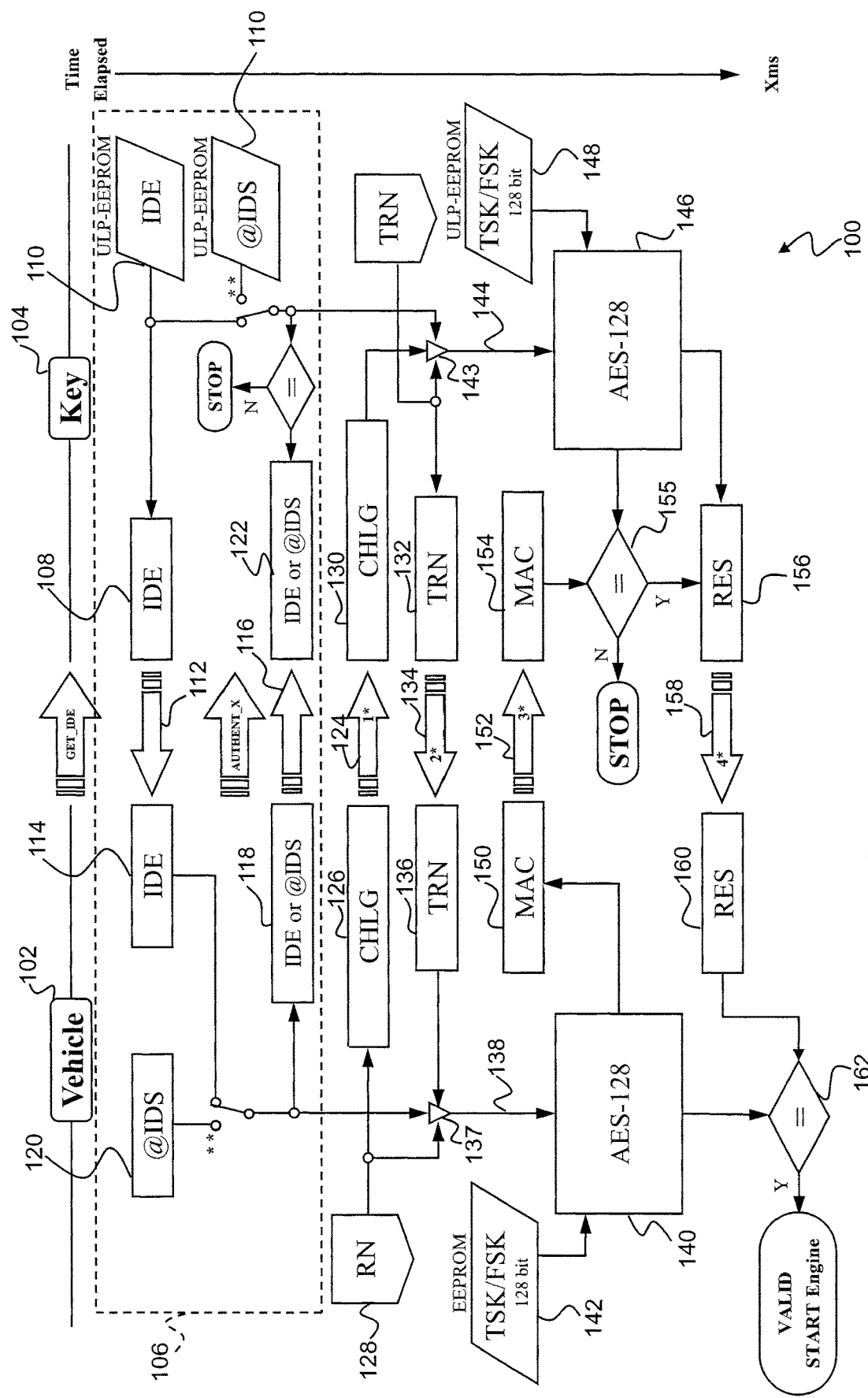
FIG. 1 shows a flow chart for an example of a four-pass authentication procedure between first and second-transceivers.

FIG. 1 illustrates a flow chart for an example of a four-pass authentication procedure 100 for authenticating communications between a first-transceiver 102 and a second-transceiver 104. In this example, the first-transceiver 102 is provided by a base station in a vehicle and the second-transceiver 104 is provided in a transponder key for the vehicle. Various messages are passed between the first and second-transceivers 102, 104 during the authentication procedure 100. The transmission of messages is indicated in FIG. 1 by arrows between the first and second-transceivers 102, 104. FIG. 1 is also generally arranged so that the order of the transmission of messages is illustrated chronologically, along a vertical time axis.

As a prelude to the four-pass authentication procedure 100, the first and second-transceivers 102, 104 cross-check device identifiers during an identity check 106. In this example of the identity check 106, the second-transceiver 104 retrieves a device identifier (e.g. serial number) IDE 108 from storage 110 and transmits 112 the device identifier IDE 108 to the first-transceiver 102. The device identifier IDE 108 may be an 8-, 16-, 32-, 64- or 128-bit identifier, for example. In this example, the storage 110 is provided by ultra-low-power electrically-erasable, programmable read-only-memory (ULP-EEPROM).

In consequence of the transmission 112, a received device identifier IDE 114 is obtained at the first-transceiver 102. The first-transceiver 102 then transmits 116 a response identifier (IDE or @IDS) 118 to the second-transceiver 104. The response identifier 118 may be the received IDE 114 or, optionally, an identifier address (@IDS) 120. The identifier address 120 may be provided, for example, by a 5-bit pointer to an identifier in an address in storage 110 at the second-transceiver 104. In consequence of the transmission 116, a received-response identifier 122 is obtained at the second-transceiver 104. The first and second-transceivers 102, 104 are synchronised so that they both either operated on the device identifier (IDE) 108, 114 or the identifier address (@IDS) 120. At the second-transceiver 104, the selected device identifier (IDE or retrieved using @IDS) from the received-response identifier 122 is compared with the corresponding device identifier (IDE or retrieved using @IDS) obtained from storage 110 of the second-transceiver 104. If the received-response identifier 122 and the value obtained from storage 110 do not match then the procedure is stopped (STOP), otherwise, the procedure commences with the four-pass authentication.

In a first, challenge-pass, a first transmission 124 of a challenge (CHLG) 126 based on a first-random-number (RN) 128 is sent from the first-transceiver 102 to the second-transceiver 104. A received-challenge (CHLG) 130 is subsequently obtained at the second-transceiver 104. The first-random-number (RN) 128 may be a pseudo-random number and may be an 8-, 16-, 32-, 64- or 128-bit value, for example.

In a second, return-pass, a second-random-number (TRN) 132 is transmitted in a second transmission 134 from the second-transceiver 104 to the first-transceiver 102. A received second-random-number 136 is then obtained at the first-transceiver 102. The second-random-number (TRN) 132 may be a pseudo-random number and may be an 8-, 16-, 32-, 64- or 128-bit value, for example. The first-random-number (RN) 128 (used for the Challenge) and the second-random-number (TRN) 132 may be independent values, generated by non-correlated random number generators.

The first-random-number 128, second-random-number 136 and selected identifier (IDE or identifier retrieved using @IDS) are combined 137 by, for example, concatenation at the first-transceiver 102. A combined value 138 is provided to a cipher 140 of the first-transceiver 102. The cipher 140 encrypts the combined value 138 using a session key (TSK/FSK) obtained from storage 142. Correspondingly, at the second-transceiver 104, the received-challenge (CHLG) 130 (which relates to the random number 128) is combined 143 by, for example, concatenation with the second-random-number 132 and the selected identifier (IDE or identifier retrieved using @IDS) obtained from storage 110 in order to provide a combined value 144 at the second-transceiver 104. The combined value 144 is encrypted by a cipher 146 at the second-transceiver 104 using a session key (TSK/FSK) retrieved from storage 148. The session key (TSK/FSK) used by the first and second-transceivers 102, 104 are shared session keys in order to provide a symmetric encryption/decryption scheme. In this example, the session keys (TSK/FSK) are provided by 128-bit AES keys and the ciphers 140, 146 apply a cipher defined by the NIST Federal Information Processing Standard (FIPS) for the Advanced Encryption Standard (AES) in FIPS-197.

In a third, message-authentication-pass, a first-portion of an output-vector from the cipher 140 of the first-transceiver 102 is used to provide a message-authentication-code (MAC) 150. The message-authentication-code (MAC) 150 may be an 8-, 16-, 32-, 64- or 128-bit value, for example. The message-authentication-code (MAC) 150 is transmitted as a third transmission 152 from the first-transceiver 102 to the second-transceiver 104. A received-message-authentication-code (MAC) 154 is therefore obtained at the second-transceiver 104. A corresponding first-portion of an output-vector of the cipher 146 is compared 155 with the received-message-authentication-code (MAC) 154 at the second-transceiver 104. If the first-portion of the output-vector does not match the received-message-authentication-code (MAC) 154 then the procedure is stopped. If the first-portion of the output-vector does match the received-message-authentication-code (MAC) 154 then a fourth pass in the procedure is initiated.

In the fourth, response-pass, a second-portion of the output-vector (which is different from the first-portion of the output-vector, e.g. least significant bits as opposed to most significant bits) is used to provide a response (RES) 156. The response (RES) 156 may be an 8-, 16-, 32-, 64- or 128-bit value, for example. The response (RES) 156 is transmitted as a fourth transmission 158 from the second-transceiver 104 to the first-transceiver 102. A received-response (RES) 160 is therefore received at the first-transceiver 102. The received-response (RES) 160 is compared 162 (as discussed further below with reference to FIG. 2) at the first-transceiver 102 with a second-portion of the output-vector of the cipher 140 (which corresponds to the second-portion of the output-vector generated by the cipher 146 of the second-transceiver 104). If the second-portion of the output-vector matches the received-response (RES) 160 then the output of the authentication procedure is that the interaction has been successfully authenticated, otherwise the output is authentication failure. The procedure may be performed repeatedly, or iteratively.

In the context of a vehicular system, the output may be used to authorise access to functionality of the vehicle, such as unlocking a door, starting the engine or enabling operation of an on-board system.

Figure 2:
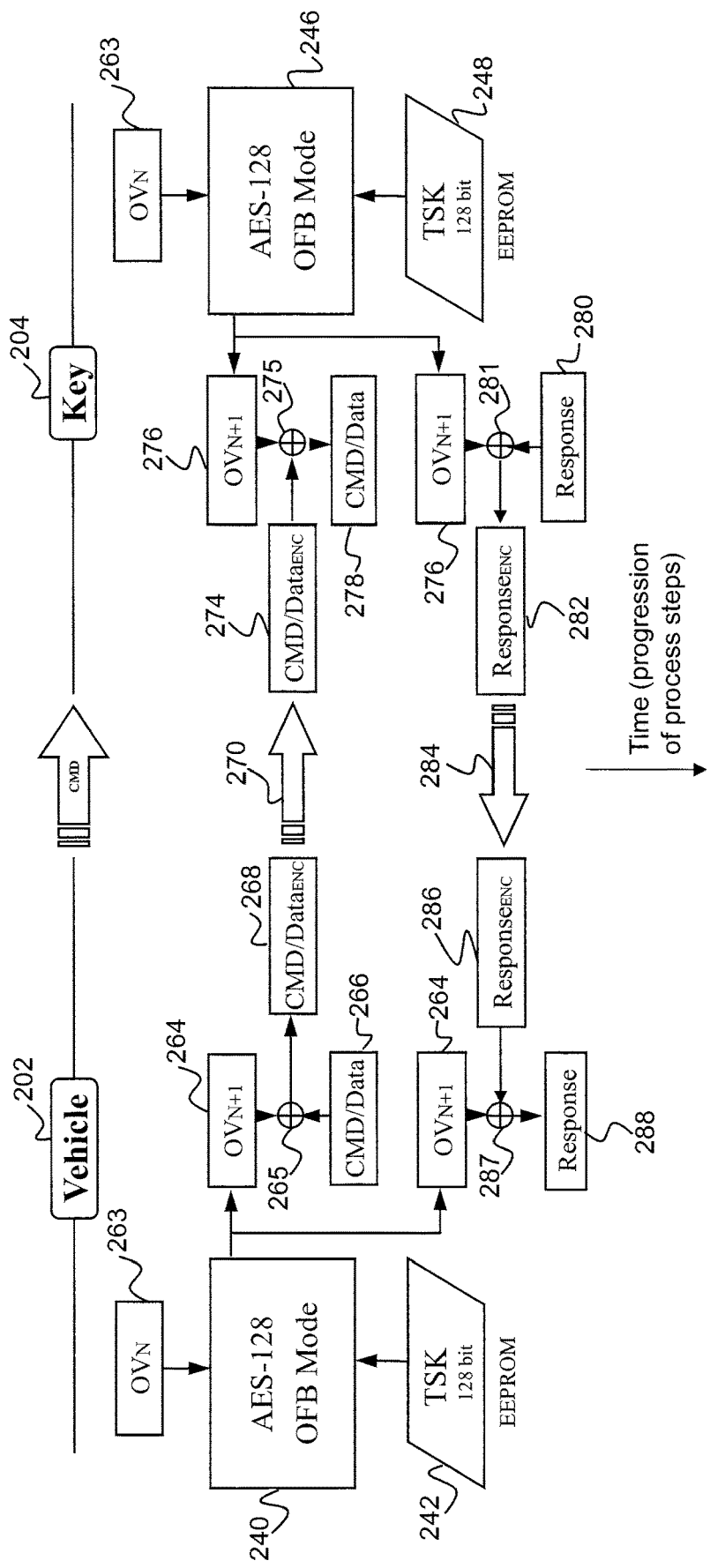
FIG. 2 shows a flow chart for an example of an encrypted data exchange in which encrypted data is transferred between first and second-transceivers.

FIG. 2 illustrates a schematic block diagram of an encrypted data exchange that may be performed after successful authentication as shown in FIG. 1. As in FIG. 1, the communication system includes a first transponder 202 and a second transponder 204.

The first-transceiver 202 has a cipher 240 that is configured to encrypt an input value using a key 242 from storage in an output feedback (OFB) mode. That is, in a first iteration, an initialization vector is encrypted by the cipher 240 using the key 242 to provide an output vector ($OV_N$) 263, and in subsequent iterations an output vector ($OV_N$) 263 from an earlier iteration is encrypted by the cipher 240 using the key 242 to provide an output vector ($OV_{N+1}$). A corresponding cipher 246 and key 248 are provided by the second-transceiver 204 so that the first and second-transceivers 202, 204 can perform symmetric encryption and decryption. The keys 242, 248 of the first and second-transceivers 202, 204 may be corresponding (matching) AES-128 session keys.

In a message-authentication-pass, at least a portion of an output-vector $OV_{N+1}$ 264 of the cipher 240 is combined 265 with payload-data 266 to provide encrypted-payload-data (CMD/Data$_{ENC}$) 268. The combination 265 may be achieved using a bit-wise XOR function. The encrypted-payload-data 268 is transmitted 270 by the first-transceiver 202 to the second-transceiver 204. At the second-transceiver 204, received-encrypted-payload-data 274 is combined 275 with at least a portion of a corresponding output-vector $OV_{N+1}$ 276 of the cipher 246 to provide decrypted-received-payload-data (CMD) 278. This combination 265 may also be achieved using a bit-wise XOR function.

The decrypted-received-payload-data (CMD) 278 can be compared with expected-data at the second-transceiver 204 in order to authenticate the identity of the first-transceiver 202. If the identity of the first-transceiver 202 is authenticated then the second-transceiver 204 may provide a response in a response-pass.

In the response-pass, at least a portion of the output-vector $OV_{N+1}$ 276 is combined 281 with a response-signature 280 to provide an encrypted-response 282. The encrypted-response is transmitted in an encrypted-response-transmission 284 from the second-transceiver 204 to the first-transceiver 202. A received-encrypted-response 286 is obtained at the first-transceiver 202 and combined 287 with the output-vector $OV_{N+1}$ 264 of the cipher 246 to provide a decrypted-received-response 288.

The decrypted-received-response 288 can be compared with expected-data at the first-transceiver 202 in order to authenticate the identity of the second-transceiver 204. In this way, mutual authentication is provided by the first and second-transceivers. However, data integrity is not ensured in this example. A man-in-the-middle attacker could flip single bits and could change, for example, EEPROM contents in the key in case a write command was applied.

Figure 3:
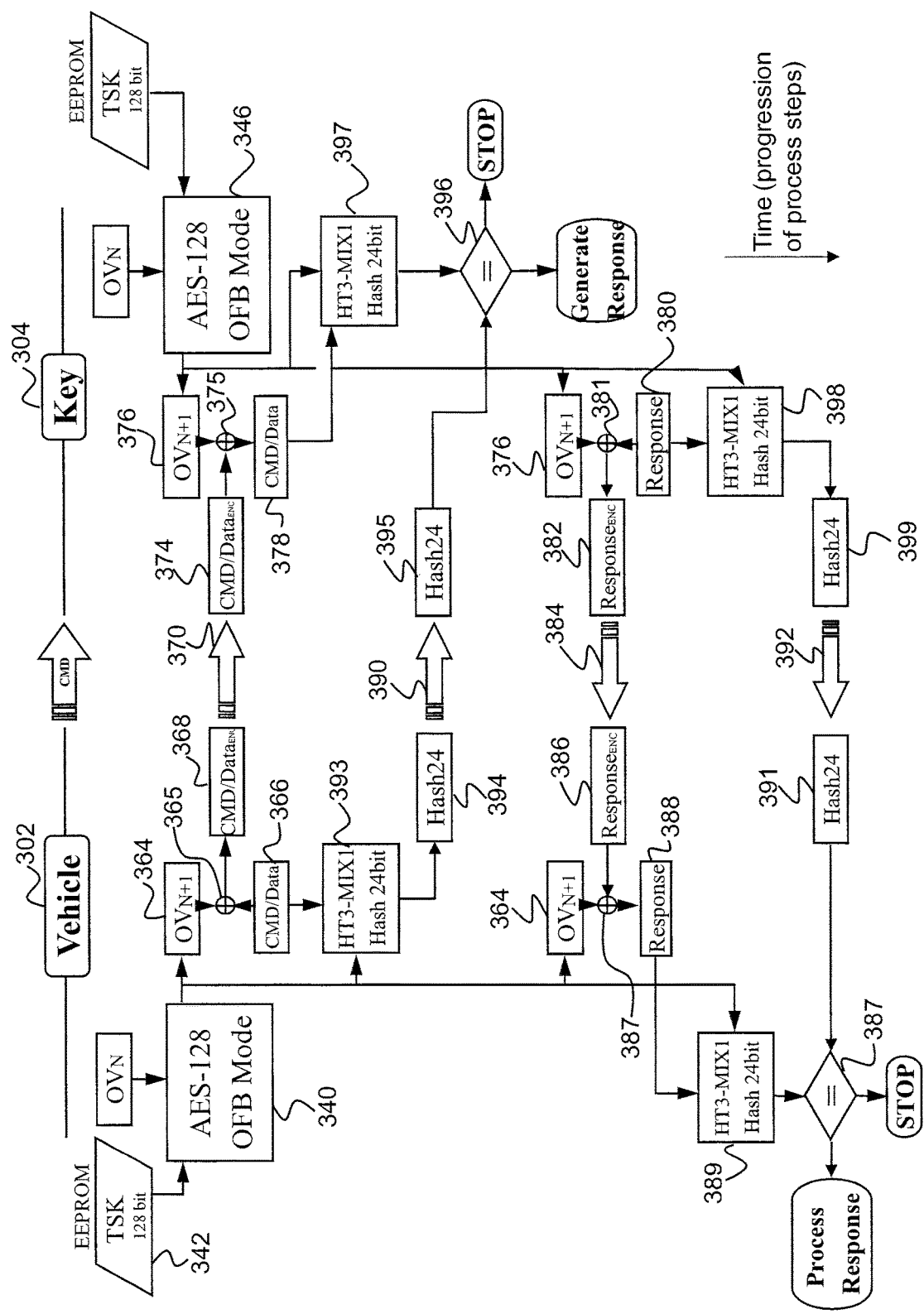
FIG. 3 shows a flow chart for an example of a portion of an authentication procedure in which encrypted and hashed data is transferred between first and second-transceivers.

FIG. 3 illustrates a schematic block diagram for processing a command/response interaction such as that described previously with regards to FIG. 2 in which the message-authentication/response integrity is ensured using hashing. Message-authentication and response steps in FIG. 3 correspond to the steps described previously with reference to FIG. 2. Corresponding reference numerals are used between FIGS. 2 and 3 to refer to similar items. In addition, the process described with reference to FIG. 3 includes a hashed-payload-data-transmission 390 and a hashed-response-transmission 392.

At the first-transceiver 302, at least a portion of the output-vector $OV_{N+1}$ 364 from the cipher 340 is used a seed to hash 393 the payload-data CMD 366 to provide hashed-payload-data 394. In this way, (different portions of) the output-vectors $OV_{N+1}$ 364 serve the dual functions of a session key for the hashing algorithm and a cipher-code to encrypt the payload-data 366.

The hashed-payload-data 394 is transmitted from the first-transceiver 302 to the second-transceiver 304 as a hashed-payload-data-transmission 390. As such a hash value of the exchanged data can be calculated and attached to each encrypted frame. Received-hashed-payload-data 395 is obtained at the second-transceiver 304. Also at the second-transceiver 304, at least a portion of the output-vector $OV_{N+1}$ 376 of the cipher 346 is hashed 397 with the decrypted-received-payload-data 378 to provide hashed-decrypted-payload-data, which is compared 396 with the received-hashed-payload-data 395. If the received-hashed-payload-data 395 matches the hashed-decrypted-payload-data then the integrity of the transferred data is confirmed and the response-pass is performed, otherwise the procedure stops (STOP).

During the response-pass, the response-signature 380 is hashed 398 using at least a portion of the output-vector $OV_{N+1}$ 376 of the cipher 346 at the second-transceiver 304 to provide a hashed-response 399. The hashed-response 399 is transmitted from the second-transceiver 304 to the first-transceiver 302 in a hashed-response-transmission 392. A received-hashed-response 391 is obtained at the first-transceiver 302. A decrypted-received-response 388 is hashed 389 using at least a portion of the output-vector $OV_{N+1}$ 364 of the cipher 340 at the first-transceiver 302 to provide a hashed-decrypted-response. The hashed-decrypted-response is compared 385 with the received-hashed-response 391. If the hashed-decrypted-response matches the received-hashed-response 391 then the output of the procedure is that the response is validated, otherwise the procedure stops (STOP).

An advantage of using the output-vector as the hash seed is that the output-vector generated by the cipher in OFB mode is always new for each iteration. A further advantage of using the output-vector as the hash seed is that it renders dedicated seed generation hardware unnecessary. This may be particularly useful for automotive access applications in which processing power or energy are constrained because, typically, strong seed generation processes are relatively computationally expensive.

Each hashing operation 389, 393, 397, 398 may be performed using the same hashing function. The hashing function may be a shift register based cryptographic function for securely hashing the payload-data. It is advantageous for some automotive immobiliser applications for the hash function to be easily executable using a general-purpose processor, rather than a dedicated processing unit, so that the hashing function may be added to existing designs without the need to change hardware specifications. For example, a linear-feedback shift register implemented hashing function such as HT3 (and in particular HT3-MIX1) has been found to offer a suitable level of integrity verification for relatively low computational effort that may be readily implemented in some automotive applications. In this way, the hash may be optimized for very short calculation times for the hash itself and low extra payload for the hash bits. At the same time, frame length may be reduced or optimized to provide practical security for automotive systems. For example, it would take more than 1 year trial and error to create a valid hash from known payload for the example described with reference to FIG. 3.

The hashing operations 389, 393, 397, 398 command en/decrypting combination operations 365, 375, and response en/decrypting combination operations 381, 387 may each be performed on different portions of the output vector $OV_{N+1}$ 364, 376 in order to improve cryptographic security. Each output vector $OV_{N+1}$ 364, 376 may therefore be considered to have a plurality of portions. For example, the least significant bits of an output vector may be used for hashing operation 389, 393, 397, and the most significant bits may be used for en/decrypting combination operations 365, 375, 381, 387.

Figure 4:
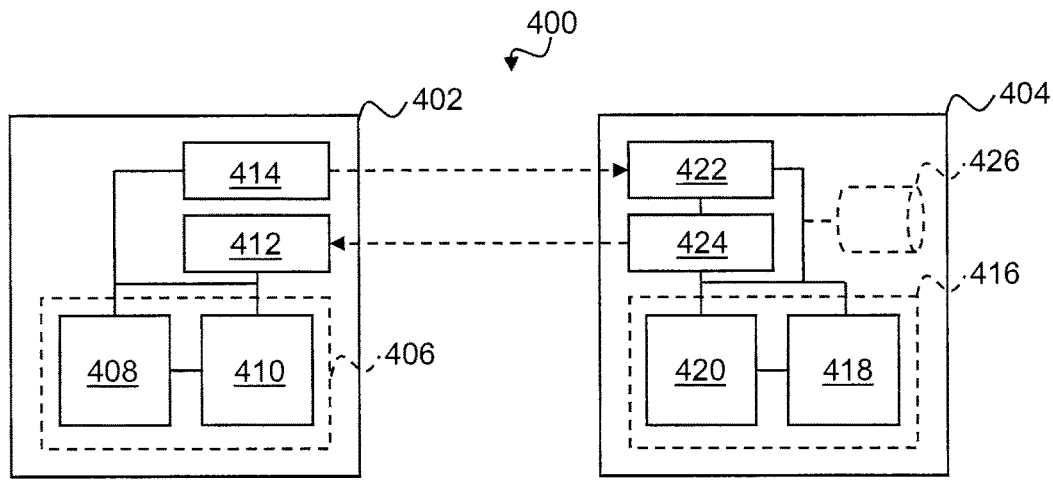
FIG. 4 shows a schematic block diagram for an example of a system having first and second-transceivers.

FIG. 4 illustrates a schematic block diagram of a system 400 comprising a first-transceiver 402 and a second-transceiver 404, which may be used to implement features of the methods described above with respect to FIG. 3 or below with respect to FIG. 5.

The first-transceiver 402 comprises a processor 406 operatively coupled to a receiver 412 and a transmitter 414. In this example, the processor 406 comprises a cipher-module 408 and a hashing-module 410. The processor 406 may be a processor configured to provide cipher, hashing and validation functions. Alternatively, either or both of the cipher-module 408 and the hashing-module 410 may be provided by dedicated processing units within the processor 406.

The second-transceiver 404 comprises a processor 416, a receiver 422 and a transmitter 424. The transmitter 414 of the first-transceiver 402 is configured to communicate with the receiver 422 of the second-transceiver 404. The transmitter 424 of the second-transceiver 404 is configured to communicate with the receiver 412 of the first-transceiver 402.

The processor 416 of the second-transceiver 404 corresponds to the processor 406 of the transceiver 402 in that it comprises a cipher-module 418 and a hashing-module 420. The processors 406, 416 of the first and second-transceivers 402, 404 may be provided with memory or storage in order to store data, including cipher keys.

The first and/or transceiver 402, 404 may be provided by a charge-and-talk device. That is, a device that obtains power through a receiver or antenna by induction, for example, and stores the power in order to provide energy to enable communication with another device. In the illustrated example, the second-transceiver 404 comprises an energy storage unit 426, which may be provided by a capacitor. The energy storage unit 426 is coupled to the receiver 422 in order to receive and return energy and is also coupled to the remaining components (the transmitter 424 and the processor 416) in order to power the second-transceiver 404.

Charge-and-talk devices may be considered to be examples of parasitic energy consuming devices because they obtain energy from the environment surrounding the device, or from a transmission from another device with which the device interacts. Charge-and-talk devices, by their very nature, operate under very tight energy usage constraints. It is therefore desirable to limit or reduce the power-consumption of components required within such devices. Typically, energy consumption constraints also dictate computational power constraints for a device. Tags, such as key fob transponders for passive keyless entry or other vehicle access, are also examples of devices with heavy energy efficiency constraints which reduce the ability to support complex computational functions on-board the tags.

Figure 5:
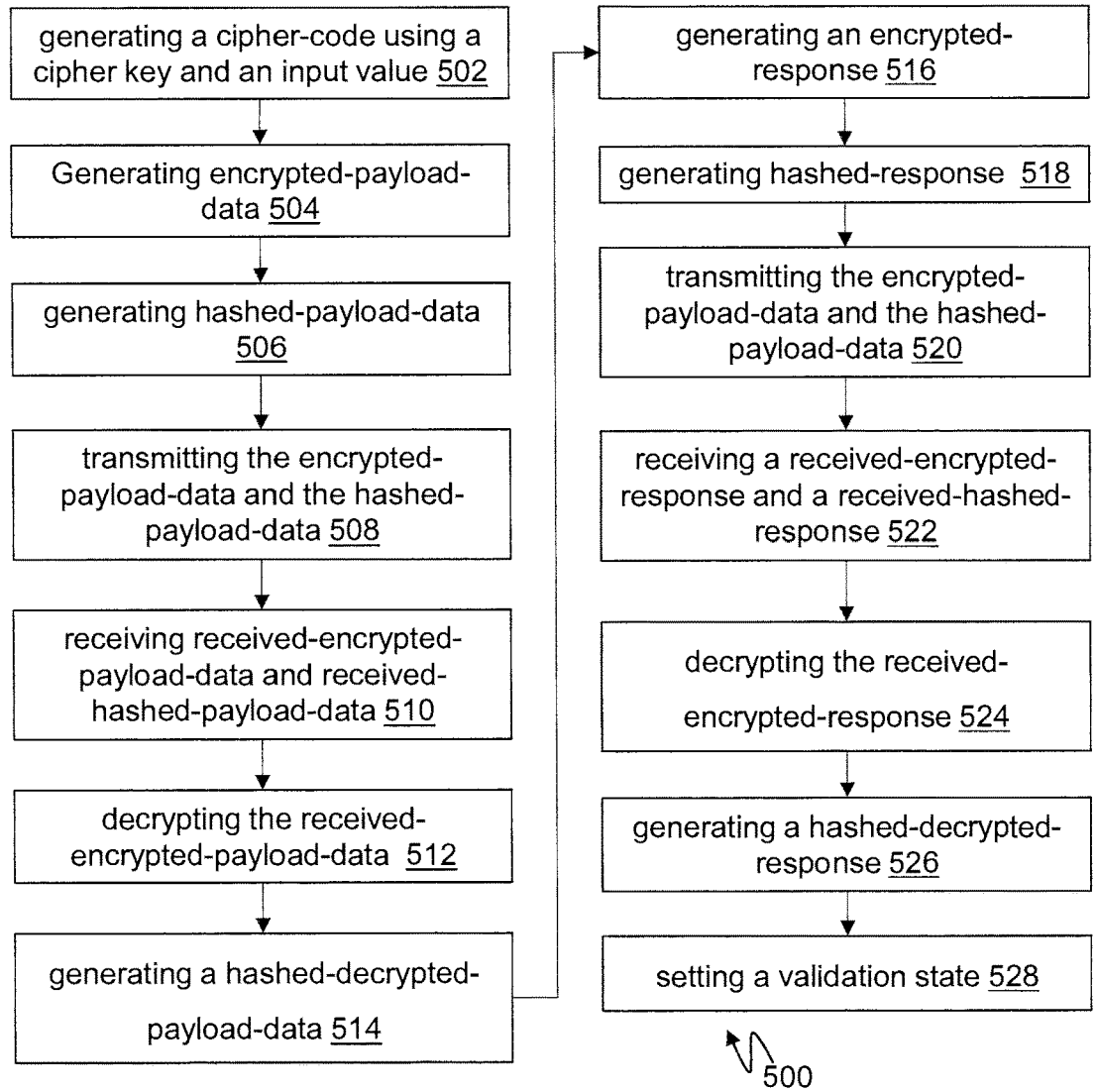
FIG. 5 shows a flow chart for another example of a method in which encrypted and hashed data is transferred between first and second-transceivers.

FIG. 5 illustrates a block diagram representation of a method 500 for operating a vehicle-access-system having a first-transceiver and a second-transceiver, such as that described previously with reference to FIG. 4. The method 500 comprises generating corresponding cipher-codes at the first and second-transceivers using a cipher key and an input value.

As shown in FIG. 5, at the first-transceiver:
  encrypted-payload-data are generated 504 from payload-data using the cipher-code;
  payload-data are hashed 506 to generate hashed-payload-data using the cipher-code; and
  the encrypted-payload-data and the hashed-payload-data are transmitted 508 to the second receiver.
At the second-transceiver:
  received-encrypted-payload-data and received-hashed-payload-data are received 510;
  the received-encrypted-payload-data are decrypted 512 to provide decrypted-received-payload-data using the cipher-code; and
  the decrypted-received-payload-data are hashed 514 to generate hashed-decrypted-payload-data.
At the second-transceiver, in accordance with a comparison of the hashed-decrypted-payload-data and the received-hashed-payload-data:
  an encrypted-response is generated 516 from a response-signature using the cipher-code;
  the response-signature is hashed 518 to generate a hashed-response using the cipher-code; and
  the encrypted-payload-data and the hashed-payload-data are transmitted 520 to the first-transceiver.
At the first-transceiver:
  a received-encrypted-response and a received-hashed-response are received 522;
  the received-encrypted-response is decrypted 524 using the cipher-code to provide a decrypted-received-response,
  the decrypted-received-response is hashed 526 to generate a hashed-decrypted-response; and
  a validation state is set 528 in accordance with a comparison of the hashed-decrypted-response and the received-hashed-response by, for example, a validator.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, Internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A first-transceiver for communicating with a second-transceiver, wherein the first and second-transceivers are vehicle-access-system transceivers, comprising:
  a block cipher-module configured to generate a cipher-code using a cipher key and an input value;
  an encryption-module configured to generate encrypted-payload-data from payload-data using a first section of the cipher-code, wherein session keys used by the first-transceiver and the second-transceiver are shared session keys in order to provide a symmetric encryption/decryption scheme, wherein the block cipher-module of the first-transceiver is configured to use an identical key as a block cipher-module of the second-transceiver;

a hashing-module configured to hash the payload-data to generate hashed-payload-data using a different, second section of the cipher-code; and a transmitter configured to transmit the encrypted-payload-data and the hashed-payload-data to the second-transceiver.

2. The first-transceiver of claim 1, further comprising:

a receiver configured to receive received-hashed-response and a received-encrypted-response;

a decryption-module configured to decrypt the received-encrypted-response to provide a decrypted-received-response using the cipher-code, in which the hashing-module is further configured to hash the decrypted-received-response to generate a hashed-decrypted-response; and a validator configured to set a validation state in accordance with a comparison of the hashed-decrypted-response and the received-hashed-response.

3. A second-transceiver for communicating with a first-transceiver, wherein the first and second-transceivers are vehicle-access-system transceivers, comprising:

a block cipher-module configured to provide a cipher-code using a cipher key and an input value;

an encryption-module configured to generate an encrypted-response from a response-signature using a first section of the cipher-code, wherein session keys used by the first-transceiver and the second-transceiver are shared session keys in order to provide a symmetric encryption/decryption scheme, wherein the block cipher-module of the first-transceiver is configured to use an identical key as a block cipher-module of the second-transceiver;

a hashing-module configured to hash the response-signature to generate a hashed-response using a different, second section of the cipher-code; and a transmitter configured to transmit the encrypted-response and the hashed-response to the first-transceiver.

4. The second-transceiver of claim 3, further comprising:

a receiver configured to receive received-hashed-payload-data and received-encrypted-payload-data;

a decryption-module configured to decrypt the received-encrypted-payload-data to provide decrypted-received-payload-data using the cipher-code, in which the hashing-module is further configured to hash the decrypted-received-payload-data to generate hashed-decrypted-payload-data; and a validator configured to enable one or more of the encryption-module, hashing-module and the transmitter in accordance with a comparison of the hashed-decrypted-payload-data and the received-hashed-payload-data.

5. The second-transceiver of claim 3, comprising an energy storage unit coupled to an antenna in order to receive energy and configured to power the transceiver during use.

6. The first-transceiver of claim 1, in which the block cipher-module is configured to operate in an output feedback, OFB, mode.

7. The first-transceiver of claim 1, in which the block cipher-module is an AES encryption-module.

8. The first-transceiver of claim 1, in which the hashing-module is configured to apply a shift-register-based hash.

9. The first-transceiver of claim 1, in which the hashing-module is implemented using a multi-purpose processor.

10. A vehicle comprising the first-transceiver of claim 1, in which access to one or more systems of the vehicle are controlled in accordance with the validation state.

11. The first-transceiver of claim 1 wherein the first-transceiver and the second-transceiver are configured to iteratively transmit encrypted-payload-data and encrypted responses, and a new cipher-code is used for each iteration.

12. A method for operating a vehicle-access-system, comprising:

generating a block cipher-code using a cipher key and an input value;

generating, at a first-transceiver, encrypted-payload-data from payload-data using a first section of the cipher-code, wherein session keys used by the first-transceiver and a second-transceiver are shared session keys in order to provide a symmetric encryption/decryption scheme, wherein the block cipher-module of the first-transceiver is configured to use an identical key as a block cipher-module of the second-transceiver;

hashing, at the first-transceiver, the payload-data to generate hashed-payload-data using a different, second section of the cipher-code;

transmitting, at the first-transceiver, the encrypted-payload-data and the hashed-payload-data;

receiving, at the second-transceiver, received-encrypted-payload-data and received-hashed-payload-data;

decrypting, at the second-transceiver, the received-encrypted-payload-data to provide decrypted-received-payload-data using the cipher-code;

hashing, at the second-transceiver, the decrypted-received-payload-data to generate hashed-decrypted-payload-data;

in accordance with a comparison of the hashed-decrypted-payload-data and the received-hashed-payload-data:

generating, at the second-transceiver, an encrypted-response from a response-signature using the cipher-code;

hashing, at the second-transceiver, the response-signature to generate a hashed-response using the cipher-code;

transmitting the encrypted-payload-data and the hashed-payload-data to the first-transceiver;

receiving, at the first-transceiver, a received-encrypted-response and a received-hashed-response;

decrypting, at the first-transceiver, the received-encrypted-response to provide a decrypted-received-response using the cipher-code;

hashing, at the first-transceiver, the decrypted-received-response to generate a hashed-decrypted-response; and setting, at the first-transceiver, a validation state in accordance with a comparison of the hashed-decrypted-response and the received-hashed-response.

13. The vehicle-access-system of claim 1, in which the first and second transceivers are configured to perform four-pass authentication.

* * * * *